Feb. 21, 1928.
H. D. HINDS
1,659,820
REVERSE GEAR MECHANISM
Filed Aug. 9, 1926
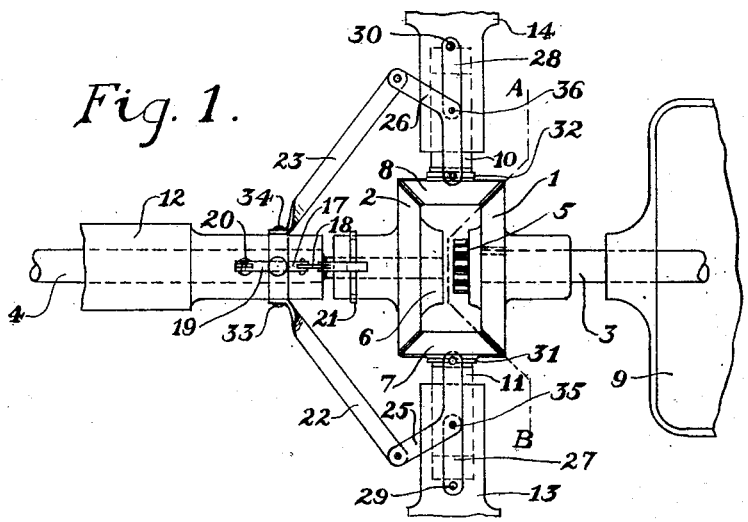
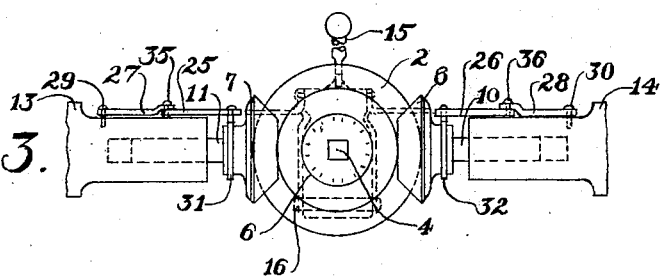
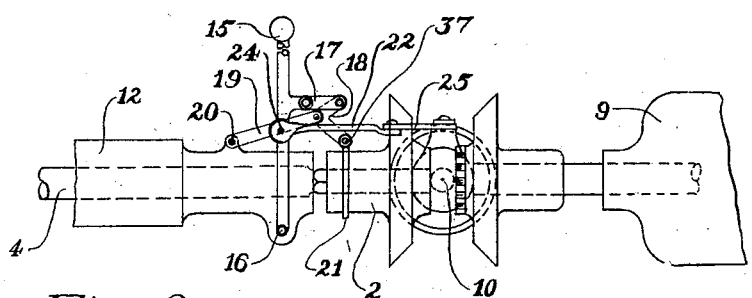
Witnesses:
1. Josephine J. De Rose
2. Thomas M. Fulton
Hubert D. Hinds
INVENTOR.
BY Q. B. McCall
ATTORNEYS.

Patented Feb. 21, 1928.

1,659,820

UNITED STATES PATENT OFFICE.

HUBERT D. HINDS, OF SPRINGFIELD, ILLINOIS.

REVERSE-GEAR MECHANISM.

Application filed August 9, 1926. Serial No. 128,310.

My invention relates to new and useful improvements in gear mechanisms adapted to be used in connection with the normal operation of motor vehicles and the like, an object being in this device particularly to provide a reverse gear mechanism in connection with the drive shaft of a motor vehicle.

A particular object of my invention is to provide in connection with a reverse gear mechanism for a motor vehicle, means for economically and substantially providing a device for the purpose described that may be successfully used in connection with a motor vehicle transmission for which I have filed application for Letters Patent on May 8, 1926 bearing Ser. No. 107,620.

I attain the objects of my invention with the device in the annexed specifications, recited in the claim and illustrated in the accompanying drawings in which like reference numerals indicate like parts in the several figures.

Referring to the drawings:

Figure 1 is a top view of the device of my invention shown in its positions of adjustment.

Figure 2 is a side elevation of the same.

Figure 3 is a section A to B of the reverse gear mechanism of my invention.

Referring in detail to the device of my invention and the operative relation of the several parts thereof, I provide a pair of ring gears —1— and —2— connected respectively to two aligned sections —3— and —4— of a drive shaft and adapted to be operatively engaged through cogs —5— and —6— respectively when a car is running forward and adapted to be operatively connected to effect reverse motion in a car through idler gears —7— and —8— respectively when gears —1— and —2— are disengaged.

Shaft section —3— is operatively connected with transmission —9— and gear —1— is secured to that shaft section while ring gear —2— is adapted to be slidably adjustable on shaft section —4— when making and breaking contact with gear —1—.

Idler gears —7— and —8— are mounted on shafts —10— and —11— respectively for slidable adjustment and support while shaft —10— is rotatable and slidably mounted in casing —14— and drive shaft section —4— is mounted in frame structure —12— for rotation therein.

The operative relation of the parts of my invention are pointed out as follows: Hand lever —15— is pivotally mounted on frame —12— at —16— so as to be pivotally moved astride the bearing portion of frame —12— supporting shaft section —4—. To hand lever —15— is a link —17— pivotally connected with a bell crank lever —18— while bell crank lever —18— is fulcrumed to link —19— attached to bearing portion of frame —12— at point —20— while the bell crank lever is pivotally secured to a fork —21— at its opposite end for the purpose of effecting a slidable adjustment through the control of hand lever —15— of gear —2— when the same is in normal operation.

Pivotally connected with hand lever —15— is a pair of control rods —22— and —23— respectively connected with hand lever —15— at point —24— and to control rods —22— and —23— are respectively connected bell crank levers —25— and —26— which are fulcrumed to links —27— and —28— respectively which are attached to frames —13— and —14— respectively at points —29— and —30— respectively. The manner of controlling the device of my invention will now be described. Figure 1. and Figure 2. in the drawings show the reverse gear mechanism of my invention in normal operation when in the reversed position for making the motor vehicle run backward and in this position, it will be noticed that ring gears —1— and —2— are disengaged while idler gears —7— and —8— are held into engagement with ring gears —1— and —2— to effect an operative connection between ring gears —1— and —2— whereby the motor vehicle may be reversed in its direction of movement when thus connected. It will be seen, however, that in order to successfully operate a reverse mechanism of this character a quick and easy method of controlling the gears in their respective adjustments should be provided and is in this case provided as will now be described.

By observing Figure 2. it will be seen that when hand lever —15— stands in the position in which gear —2— is withdrawn from engagement with gear —1— that through link —17— connected with hand lever —15— and one end of bell crank lever —18—, gear —2— is caused to be slidably moved back on shaft section —4— because of the action of bell crank lever —18— on fork —21— when handle —15— is pushed forward toward the gears and this is made possible by having bell crank lever —18— connected with crank —19— as a fulcrum attached to the frame —12— at point —20—.

In the same forward motion of hand lever —15— which retracts gear —2— through bell crank lever —18— idler gears —7— and —8— are slidably moved into engagement with gears —1— and —2— through the rotating action of bell crank levers —25— and —26— respectively which are respectively attached to links —27— and —28— as fulcrums at points —35— and —36—. Hand lever —15— is controllably connected with bell crank levers —25— and —26— respectively through connecting rods —22— and —23— respectively.

It will be seen that when idler gears —7— and —8— are in operative engagement with gears —1— and —2— that they are held into position of engagement by the arm of bell crank levers —25— and —26— respectively which are attached to forks —31— and —32— controlling idler gears —7— and —8— respectively. This is made possible in view of the fact that this arm of the bell crank lever falls into alignment on each side with links —27— and —28— respectively and in like manner gear —2— when brought into engagement with gear —1— is held into operative engagement through fork —21— by the arm of bell crank lever —18— which attaches to fork —21— at point —37— for the reason that link —19— and this arm of bell crank lever —18— fall into alignment producing a bracing effect tending to hold gear —2— into engagement with gear —1— when hand lever —15— is pulled back away from the direction of the gear. Connecting rods —22— and —23— respectively are connected with hand lever —15— at the ends —33— and —34— respectively which are made to suitably permit pivotal control of the reverse gear mechanism through the normal control of hand lever —15—.

While it is true that this device is especially adapted to operate with the above mentioned motor vehicle transmission, yet it will be evident to those skilled in the art to which this pertains that it may be adapted to be used on any suitable motor connection with drive shafts. It will be also evident that certain minor details of the structure of this device may be changed without departing from the spirit and scope of this invention but the preferred arrangement of detail has been herein above described and illustrated in the accompanying drawings.

Having thus described the nature of my invention, what I claim is:

A reverse gear mechanism and control therefor comprising a pair of bevel gears mounted on adjacent ends of aligned shafts supporting the same; one of said bevel gears integral with a drive shaft and operating as a driving gear the other bevel gear slidably mounted on a driven shaft and operating as a driven gear; said driving gear provided with a forward central protruding clutch member and said driven gear provided with a forward central recess for the cooperative accommodation of said potruding clutch member for said driving gear; a pair of oppositely disposed slidably adjustable shaft mounted idler gears simultaneously controlable with the manual control of said driven gear; said idler gears normally meshing with said driving and driven gears for the reverse movement of the driven shaft and adapted to be simultaneously disengaged from said gears with the manual ajustment of said driven gear to a position of engagement with said driving gear for the normal forward movement of the driving and driven gears, and lever means for the optional and simultaneous control of said driven gear and said pair of idler gears.

In witness whereof, I hereunto set my hand and seal this 23d day of June, A. D. 1926.

HUBERT D. HINDS.